United States Patent
Song et al.

(10) Patent No.: US 10,410,027 B1
(45) Date of Patent: Sep. 10, 2019

(54) RFID MODULE FOR THROUGH BOUNDARY LOCATION ACCURACY

(71) Applicant: MOTOROLA MOBILITY LLC, Chicago, IL (US)

(72) Inventors: Miao Song, Naperville, IL (US); Yunming Wang, Buffalo Grove, IL (US); Vivek Tyagi, Chicago, IL (US); Nikhil Ambha Madhusudhana, Chicago, IL (US)

(73) Assignee: Motorola Mobility LLC, Chicago, IL (US)

( * ) Notice: Subject to any disclaimer, the term of this patent is extended or adjusted under 35 U.S.C. 154(b) by 9 days.

(21) Appl. No.: 15/919,997

(22) Filed: Mar. 13, 2018

(51) Int. Cl.
    *G06K 7/10* (2006.01)
    *G06F 16/29* (2019.01)
(52) U.S. Cl.
    CPC ......... *G06K 7/10475* (2013.01); *G06F 16/29* (2019.01)
(58) Field of Classification Search
    CPC .................................................. G06K 7/10475
    USPC ....................................................... 235/451
    See application file for complete search history.

(56) References Cited

U.S. PATENT DOCUMENTS

| 2016/0171257 A1* | 6/2016 | Seitz .................. G06K 7/10128 340/10.1 |
| 2018/0052228 A1* | 2/2018 | Markison ........... A61B 5/02055 |

* cited by examiner

*Primary Examiner* — Toan C Ly
(74) *Attorney, Agent, or Firm* — Yudell Isidore PLLC

(57) ABSTRACT

A method and data processing device for detecting and tracking objects in a space. The method includes transmitting an inquiry signal that traverses into the space, which is behind a physical barrier and is pre-configured with a plurality of radio frequency identification (RFID) tags. The method includes monitoring for a corresponding response signal. In response to not detecting the corresponding response signal, an RFID reader module transmits a second signal. The method includes monitoring for and recording a RFID response signal, which is generated in response to the second signal impinging on the RFID tag and one or more objects in the space. The method includes extracting a reflection signal from the response signal to determine the presence of an unknown object. The method includes tracking the unknown object within the space, and providing more specific position data of the unknown object to a display of an electronic device.

20 Claims, 8 Drawing Sheets

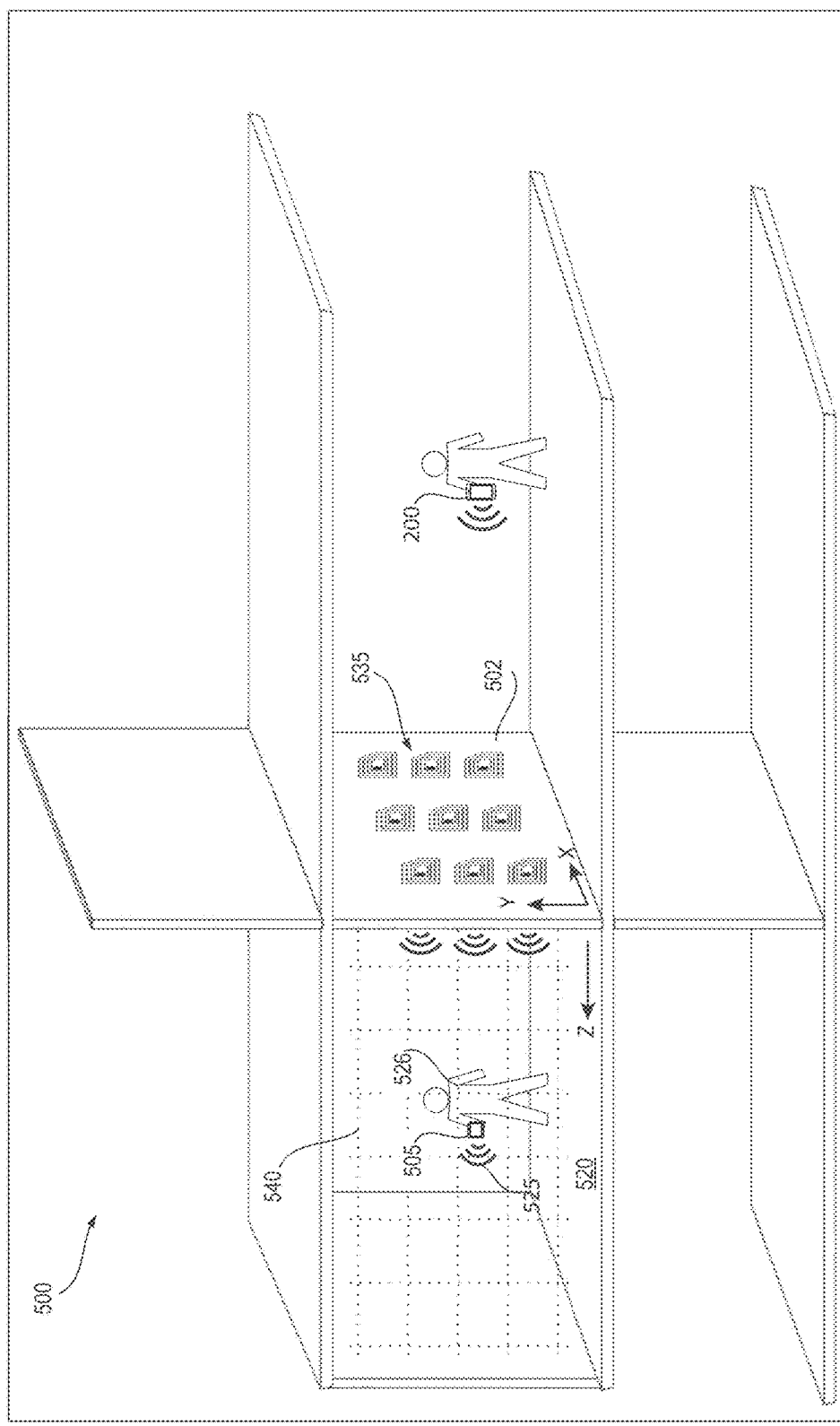

RFID MODULE FOR THROUGH BOUNDARY LOCATION ACCURACY

BACKGROUND

1. Technical Field

The present disclosure generally relates to detecting objects and in particular to a method and electronic device for detecting and tracking objects through a boundary.

2. Description of the Related Art

Beacon based detection devices, such as Bluetooth beacons, are small radio transmitters that send out signals in a radius of 10-30 meters. Beacon based detection systems can be generally placed in two categories (i) client-based systems and (ii) server-based systems. For Bluetooth beacon based detection of an object in client-based systems, an electronic device such as a smart phone, receives Bluetooth signals from beacons installed and/or equipped on the object. The electronic device utilizes the signal strength measurement for localization. For Bluetooth beacon based detection of an object in server-based systems, the beacon attached to the object sends Bluetooth signals to a computer node that is installed within an enclosed location. The computer node processes the provided signals and sends positioning data to a digital map.

Beacon based location systems are widely utilized due to low cost and minimal maintenance requirements. However, the location accuracy of some beacon base location systems is only one to two meters. In addition to an observed low level of location accuracy within these beacon based location systems, beacon base location systems require the object to be detected be equipped with and/or carrying a beacon device. Furthermore, the beacon signal being transmitted for detection may not be strong enough to cover all areas, more specifically corners, of an enclosed location.

BRIEF DESCRIPTION OF THE DRAWINGS

The description of the illustrative embodiments is to be read in conjunction with the accompanying drawings. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which:

FIG. 5 illustrates an example Bluetooth enabled communication network in which the mobile device of FIG. 2 can be used to detect and track an unknown object behind a boundary in a space within which certain aspects of the disclosure can be practiced, according to one or more embodiments;

DETAILED DESCRIPTION

Figure 1:
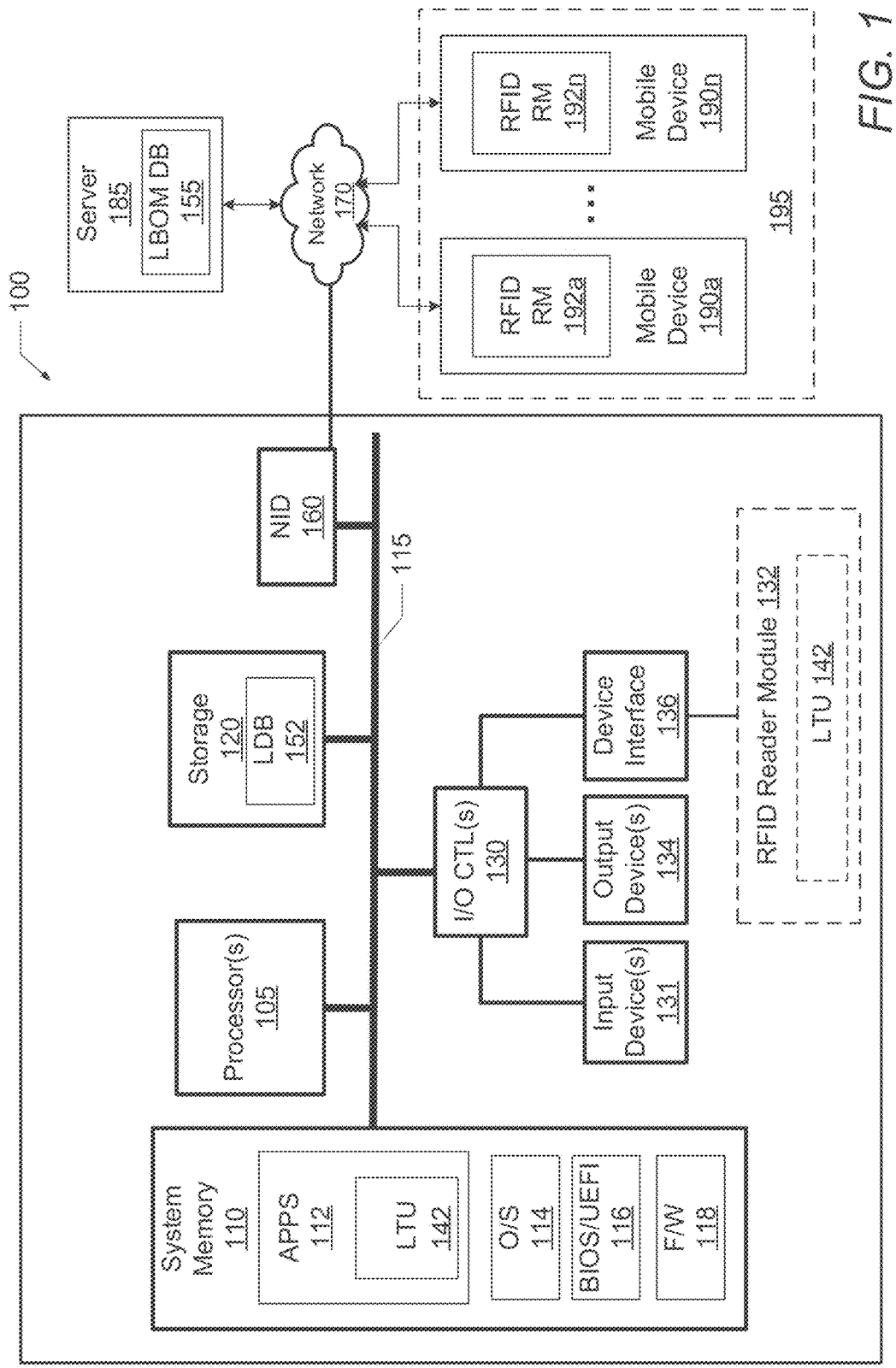
FIG. 1 provides a block diagram representation of an example data processing system within which certain aspects of the disclosure can be practiced, in accordance with one or more embodiments.

Disclosed are a method, a data processing device, and a computer program product for detecting and tracking objects in a space behind a boundary. The method includes transmitting, from a first module, a first inquiry signal, at a first frequency range, that traverses into a space associated with a predetermined grid coordinate system. The space exists behind a physical barrier and is pre-configured with a plurality of RFID tags, where each RFID tag is capable of producing a backscatter signal. The method includes monitoring for a corresponding response signal to the first inquiry signal that is emitted at the first frequency range. In response to one of: (i) not detecting the corresponding response signal from the space or (ii) detecting only a generalized response signal indicating a general presence of a detected object within the space, the method further includes transmitting, via a RFID reader module, a second signal at a second frequency range. In response to transmitting the second signal, the method includes monitoring for a response signal from at least one of the plurality of RFID tags. In response to the second signal impinging on the RFID tag and one or more objects in the space, the method includes recording the response signal, which is a backscatter signal that is a combination of a RFID tag reflection signal, a known reflection signal from a known object, and an interference reflection signal from an unknown object in the space. The method includes extracting the interference reflection signal from the response signal to determine the presence of the unknown object. In response to detecting the presence of the unknown object, the method includes tracking the unknown object within the space. Further, the method includes providing more specific position data of the unknown object within the space to a display of an electronic device, according to the predetermined grid coordinate system.

According to one embodiment, a processor of a data processing system transmits, from a first module, a first inquiry signal, at a first frequency range. The first inquiry signal traverses into a space associated with a predetermined grid coordinate system. The space exists behind a physical barrier and is pre-configured with a plurality of radio frequency identification (RFID) tags. Each RFID tag is capable of producing a backscatter signal. The processor monitors for a corresponding response signal to the first inquiry signal that is emitted at the first frequency range. In response to one of: (i) not detecting the corresponding response signal from the space or (ii) detecting only a generalized response signal indicating a general presence of a detected object within the space, transmits, via a RFID reader module, a second signal at a second frequency range. In response to transmitting the second signal, the processor monitors for a response signal from at least one of the plurality of RFID tags. The processor records the response signal which is generated in response to the second signal impinging on the RFID tag and one or more objects in the space. The response signal is a backscatter signal that is a combination of a RFID tag reflection signal, a known reflection signal from a known object, and an interference reflection signal from an unknown object in the space. The processor extracts the interference reflection signal from the response signal to determine the presence of the unknown object. Further, in response to detecting the presence of the unknown object, the RFID reader module, tracks the unknown object within the space. The processor provides more specific position data of the unknown object within the space to a display of an electronic device, according to the predetermined grid coordinate system.

The computer program product includes a computer readable storage device and program code on the computer readable storage device. When executed within a processor associated with a device, the program code enables the device to provide the functionality of transmitting, from a first module, a first inquiry signal, at a first frequency range, that traverses into a space associated with a predetermined grid coordinate system. The space exists behind a physical barrier and is pre-configured with a plurality of RFID tags, each RFID tag being capable to produce a backscatter signal. The program code further enables the device to provide the functionality of monitoring for a corresponding response signal that is emitted at the first frequency range. In response to one of: (i) not detecting the corresponding response signal from the space or (ii) detecting only a generalized response signal indicating a general presence of a detected object within the space, the program code enables the device to provide a functionality of transmitting, via a RFID reader module, a second signal at a second frequency range. In response to transmitting the second signal, the program code enables the device to provide a functionality of monitoring for a response signal from at least one of the plurality of RFID tags, and recording the response signal which is generated in response to the second signal impinging on the RFID tag and one or more objects in the space. The response signal is a backscatter signal that is a combination of a RFID tag reflection signal, a known reflection signal from a known object, and an interference reflection signal from an unknown object in the space. The program code further enables the device to provide a functionality of extracting the interference reflection signal from the response signal to determine the presence of the unknown object. In response to detecting the presence of the unknown object, the program code enables the device to provide more specific position data of the unknown object within the space to a display of an electronic device, according to the predetermined grid coordinate system.

In the following description, specific example embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from general scope of the disclosure. The following detailed description is, therefore, not to be taken in a limiting sense, and the scope of the present disclosure is defined by the appended claims and equivalents thereof.

References within the specification to "one embodiment," "an embodiment," "embodiments", or "alternate embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various aspects are described which may be aspects for some embodiments but not other embodiments.

The terminology used herein is for the purpose of describing particular embodiments only and is not intended to be limiting of the disclosure. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Moreover, the use of the terms first, second, etc. do not denote any order or importance, but rather the terms first, second, etc. are used to distinguish one element from another.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be provided its broadest interpretation given the context in which that term is utilized.

Those of ordinary skill in the art will appreciate that the hardware components and basic configuration depicted in the following figures may vary. For example, the illustrative components within the presented devices are not intended to be exhaustive, but rather are representative to highlight components that can be utilized to implement the present disclosure. For example, other devices/components may be used in addition to, or in place of, the hardware depicted. The depicted example is not meant to imply architectural or other limitations with respect to the presently described embodiments and/or the general disclosure.

Within the descriptions of the different views of the figures, the use of the same reference numerals and/or symbols in different drawings indicates similar or identical items, and similar elements can be provided similar names and reference numerals throughout the figure(s). The specific identifiers/names and reference numerals assigned to the elements are provided solely to aid in the description and are not meant to imply any limitations (structural or functional or otherwise) on the described embodiments.

FIG. 1 illustrates a block diagram representation of a data processing device, for example data processing system (DPS) 100, within which one or more of the described features of the various embodiments of the disclosure can be implemented. For example, a data processing system may be a handheld device, personal computer, a server, a network storage device, or any other suitable device and may vary in size, shape, performance, functionality, and price.

Referring specifically to FIG. 1, example DPS 100 includes one or more processor(s) 105 coupled to system memory 110 via system interconnect 115. System interconnect 115 can be interchangeably referred to as a system bus, in one or more embodiments. Also coupled to system interconnect 115 is storage 120 within which can be stored one or more software and/or firmware modules and/or data (not specifically shown). Stored within storage 120 is local database (LDB) 152. Local database 152 can be a location-based operation mapping (LBOM) database. In an alternate embodiment, a remote database is also stored within server 185 as LBOM database 155.

In one embodiment, storage 120 can be a hard drive or a solid-state drive. The one or more software and/or firmware modules within storage 120 can be loaded into system memory 110 during operation of DPS 100. As shown, system memory 110 can include therein a plurality of software and/or firmware modules including application(s) 112, operating system (O/S) 114, basic input/output system/ unified extensible firmware interface (BIOS/UEFI) 116 and other firmware (F/W) 118. The various software and/or firmware modules have varying functionality when their corresponding program code is executed by processor(s) 105 or other processing devices within DPS 100.

For example, DPS 100 includes location tracking utility (LTU) 142. LTU 142 may be provided as an application that is optionally located within system memory 110 and executed by processor 105. Within this embodiment, processor 105 executes LTU 142 to provide the various methods and functions described herein. For simplicity, LTU 142 is illustrated and described as a stand-alone or separate software/firmware/logic component, which provides the specific functions and methods described herein. However, in at least one embodiment, LTU 142 may be a component of, may be combined with, or may be incorporated within OS 114, and/or with one or more applications 112. Additional aspects of LTU 142, and functionality thereof, are presented within the description of FIGS. 2-7.

DPS 100 further includes one or more input/output (I/O) controllers 130, which support connection by, and processing of signals from, one or more connected input device(s) 131, such as a keyboard, mouse, touch screen, or microphone. I/O controllers 130 also support connection to and forwarding of output signals to one or more connected output devices 134, such as a display, audio speaker(s). Additionally, in one or more embodiments, one or more device interfaces 136, such as an optical reader, a universal serial bus (USB), a card reader, Personal Computer Memory Card International Association (PCMIA) slot, and/or a high-definition multimedia interface (HDMI), can be coupled to I/O controllers 130 or otherwise associated with DPS 100. In one or more embodiments device interface(s) 136 supports connection to radio frequency identification (RFID) reader module 132. RFID reader module 132, includes LTU 142, and/or executes functions provided by LTU 142. Device interface(s) 136 can also be utilized to enable data to be read from or stored to additional devices (not shown) for example a compact disk (CD), digital video disk (DVD), flash drive, or flash memory card. In one or more embodiments, device interfaces 136 can further include General Purpose I/O interfaces, such as an Inter-Integrated Circuit ($I^2C$) Bus, System Management Bus (SMBus), and peripheral component interconnect (PCI) buses. Further, in one or more embodiments, device interface 136 receives input from mobile device(s) 190a-n. Mobile devices 190a-n are a network of mobile devices 195. Mobile device 190a-n are equipped with RFID reader modules 192a-n which monitor and/or detect signals associated with one or more RFID tags. The RFID tags may be, for example, passive RFID tags. In another embodiment, the RFID tags are active tags. In still another embodiment, the RFID tags are a combination of passive and active tags. Additional aspects of RFID reader module 192a-n, and functionality thereof, are presented within the description of FIGS. 2-7.

DPS 100 further comprises a network interface device (NID) 160. NID 160 enables DPS 100 to communicate and/or interface with other devices, services, and components that are located external (remote) to DPS 100, for example, server 185, mobile device 190a-n, and other user devices, via a communication network. These devices, services, and components can interface with DPS 100 via an external network, such as example network 170, using one or more communication protocols. Network 170 can be a local area network, wide area network, personal area network, signal communication network, and the like, and the connection to and/or between network 170 and DPS 100 can be wired or wireless or a combination thereof. For purposes of discussion, network 170 is indicated as a single collective component for simplicity. However, it is appreciated that network 170 can comprise one or more direct connections to other devices as well as a more complex set of interconnections as can exist within a wide area network, such as the Internet.

Figure 2:
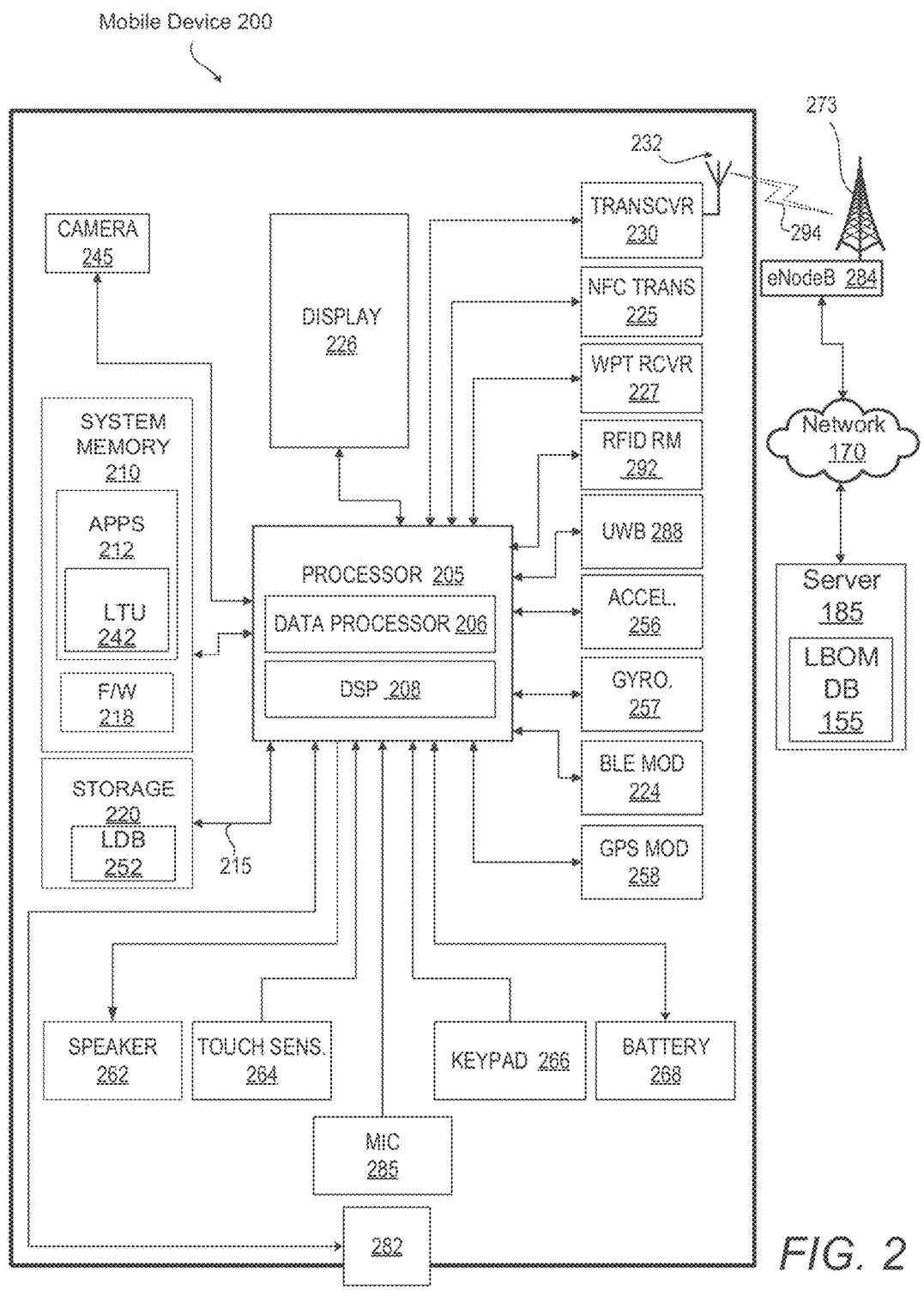
FIG. 2 illustrates a mobile device within which certain aspects of the disclosure can be practiced, in accordance with one or more embodiments.

In the description of the following figures, reference is also occasionally made to specific components illustrated within the preceding figures, utilizing the same reference numbers from the earlier figures. With reference now to FIG. 2 which illustrates another example of a data processing device, mobile device 200, within which certain aspects of the disclosure can be practiced, in accordance with one or more embodiments. Mobile device 200 can be utilized as mobile device 190a in FIG. 1, and can have similar component makeup and configuration to mobile devices 190a-n. Mobile device 200 includes at least one processor integrated circuit, processor integrated circuit (IC) 205. Included within processor IC 205 are data processor 206 and digital signal processor (DSP) 208. Processor IC 205 is coupled to system memory 210 and non-volatile storage 220 via a system communication mechanism, such as system interconnect 215. Stored within storage 220 is local database 252. One or more software and/or firmware modules can be loaded into system memory 210 during operation of mobile device 200. Specifically, in one embodiment, system memory 210 can include therein a plurality of such modules, including firmware (F/W) 218. System memory 210 may also include basic input/output system and an operating system (not shown). The software and/or firmware modules provide varying functionality when their corresponding program code is executed by processor IC 205 or by secondary processing devices within mobile device 200.

Processor IC 205 supports connection by and processing of signals from one or more connected input/output devices such as camera 245, speaker 262, touch sensor 264, microphone 285, keypad 266, and display 226. Additionally, in one or more embodiments, one or more device interfaces 282, such as an optical reader, a universal serial bus (USB), a card reader, Personal Computer Memory Card International Association (PCMIA) slot, and/or a high-definition multimedia interface (HDMI), can be associated with mobile device 200. Mobile device 200 also contains a power source such as a battery 268 that supplies power to mobile device 200.

Mobile device 200 further includes Bluetooth Low Energy (BLE) module 224, global positioning system module (GPS MOD) 258, gyroscope 257, accelerometer 256, ultra-wideband (UWB) transceiver 288, and RFID reader module 292, all of which are communicatively coupled to processor IC 205. RFID reader module 292 can be utilized as RFID reader module 192a in mobile device 190a of FIG. 1, and can have similar component makeup and configuration to RFID reader module 192a-n. BLE module 224 enables mobile device 200 and/or components within mobile device 200 to communicate and/or interface with other devices, services, and components that are located external to mobile device 200. GPS MOD 258 enables mobile device 200 to communicate and/or interface with other devices, services, and components to send and/or receive geographic position information. Gyroscope 257 communicates the angular position of mobile device 200 using gravity to help determine orientation. Accelerometer 256 is utilized to measure non-gravitational acceleration and enables processor IC 205 to determine velocity and other measurements associated with the quantified physical movement of a user or mobile device 200. RFID reader module 292 utilizes electromagnetic fields to automatically identify and monitor RFID tags associated with an array of RFID tags (discussed further in FIG. 4). UWB transceiver 288 uses radio technology that can operate with very low energy levels to send and/or receive high-bandwidth communications within an approximated range.

Mobile device 200 is presented as a wireless communication device. As a wireless device, mobile device 200 can communicate data over wireless network 170. For example, mobile device 200 transmits data to and/or receives data from LBOM database 155 within server 185. In an alternate embodiment, a copy of local database 252 is also stored, or alternatively stored within server 185 as LBOM database 155.

Mobile device 200 includes transceiver 230, which is communicatively coupled to processor IC 205 and to antenna 232. Transceiver 230 allows for wide-area or local wireless communication, via wireless signal 294, between mobile device 200 and evolved node B (eNodeB) 284, which includes antenna 273. Mobile device 200 is capable of wide-area or local wireless communication with other mobile wireless devices or with eNodeB 284 as a part of a wireless communication network. Mobile device 200 communicates with other mobile wireless devices by utilizing a communication path involving transceiver 230, antenna 232, wireless signal 294, antenna 273, and eNodeB 284. Mobile device 200 additionally includes near field communication transceiver (NFC TRANS) 225 and wireless power transfer receiver (WPT RCVR) 227. In one embodiment, other devices within mobile device 200 utilize antenna 232 to send and/or receive signals in the form of radio waves. For example, GPS module 258 communicatively couples to antenna 232 to receive location data. Additionally, antenna 232 is utilized to monitor for a response signal from the RFID tag. In one embodiment, RFID reader module 292 is a stand-alone device that includes a built-in antenna, and RFID reader module 292 is connected to mobile device 200 via device interface 282. It is appreciated that mobile devices 200.

As provided by FIG. 2, mobile device 200 additionally includes LTU 242 which executes on processor IC 205 to enable the processing of data received from RFID reader module 292. In at least one embodiment, LTU 242 may be a component of, may be combined with, or may be incorporated within one or more applications 212. As will be discussed further, processor IC 205 provides data to and retrieves data from LDB 252, within non-volatile storage 220. As will be discussed further, LDB 252 and/or LBOM database 155 provide a central database for the collection of coordinates and/or data points that are associated with response signals detected by one or more RFID reader modules, for example RFID reader modules 192a-n and 292. Mobile device 200 and components thereof are further discussed in FIG. 3.

Figure 3:
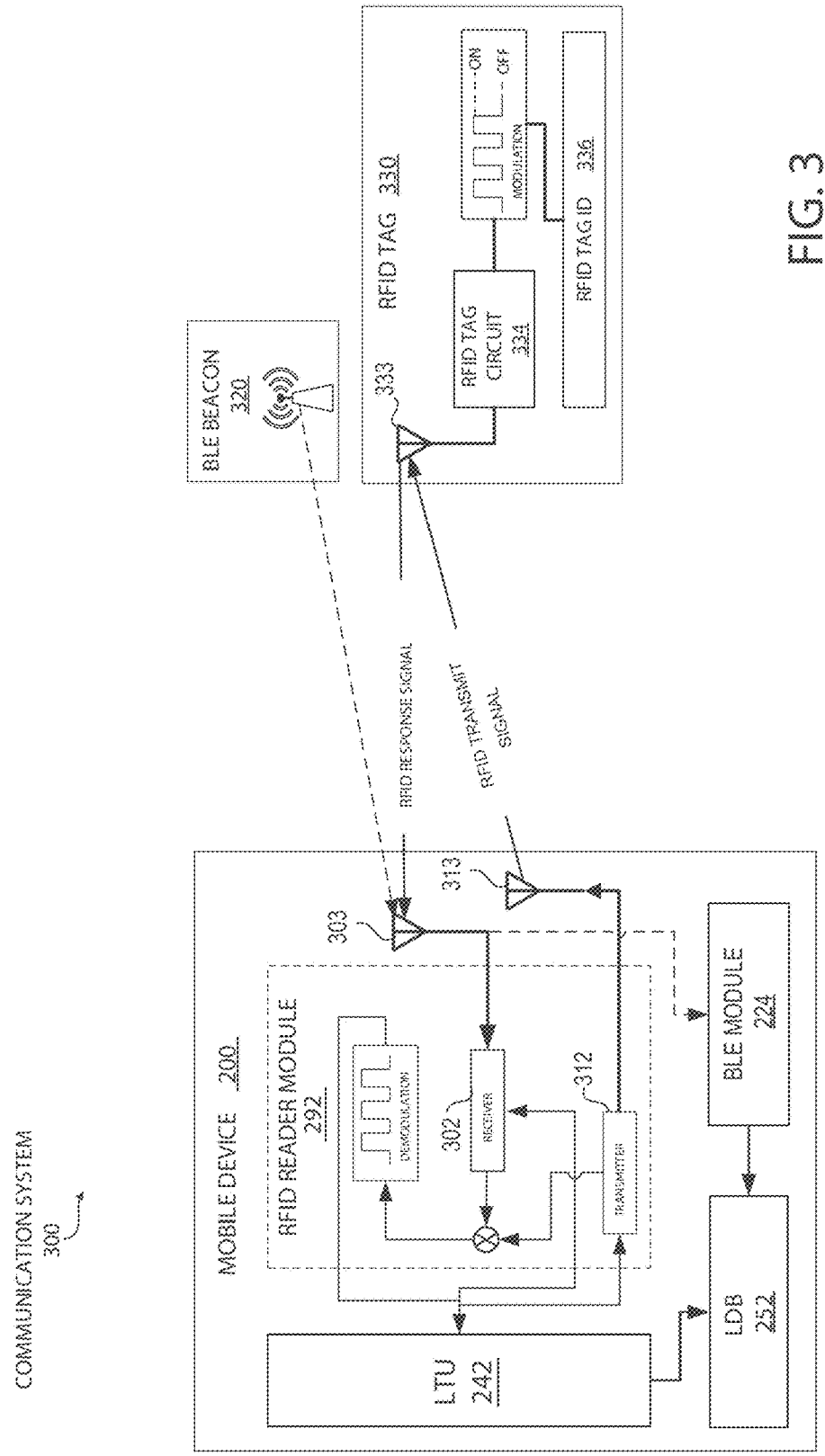
FIG. 3 illustrates a block diagram of a communication system using signal transmission and detection to monitor RFID tags, in accordance with one or more embodiments.

With reference now to FIG. 3, there is illustrated a block diagram of communication system 300 using signal transmission and signal detection in order to monitor RFID tags (330), in accordance with one or more embodiments. Communication system 300 generally includes mobile device 200, BLE beacon 320, and RFID tag 330.

Mobile device 200 includes RFID reader module 292, LTU 242, BLE module 224, and LDB 252. RFID reader module 292 includes receiver 302 connected to antenna A 303, and transmitter 312 connected to antenna B 313. Antenna B 313 is a directional antenna for transmitting a signal of a predetermined power level (e.g. 30 decibal-milliwatts (dBm)), sufficient for two-way traversal through a boundary, in a determined direction.

BLE beacon 320 is a low energy device utilized as a hardware signal transmitter. BLE module 224 and BLE beacon 320 utilize radio waves to communicate. BLE module 224 transmits an inquiry signal within a first frequency range. For example, BLE module 224 transmits a signal frequency in the range of 2.402-2.48 gigahertz (GHz). BLE beacon 320 broadcasts it's identifier to nearby electronic devices. Assuming the inquiry signal of BLE module 224 is within a detectable range of BLE beacon 320, BLE beacon 320 generates a BLE beacon response signal. The BLE beacon response signal is detected by BLE module 224.

RFID tag 330 includes RFID tag circuit 334 connected to tag antenna 333, and RFID tag identification (ID) 336. In one or more embodiments, RFID tag 330 is a passive tag. Therefore, RFID tag 330 does not require a transceiver, and does not require a battery.

RFID reader module 292 transmits a RFID transmit signal in the direction of RFID tag 330. The RFID transmit signal is, for example an indefinite signal with continuous amplitude, frequency, or phase. In one example, RFID reader module 292 supplies a RFID transmit signal that is approximately 30 (dBm). RFID tag 330 harvests energy from the RFID transmit signal. The current flowing on antenna A 303 produces a voltage that is induced on tag antenna 333. The induced current leads to radiation, producing a signal that can be detected. This detectable signal is referred to herein as the RFID response signal. RFID tag 330 modulates RFID tag ID 336 on the RFID response signal using ON-OFF keying through changing the impedance on tag antenna 333 to transmit a '1' bit and remaining silent (with no impedance change) for a '0' bit. The modulation of RFID tag ID 336 is vulnerable to interfering reflection signals from objects in vicinity to RFID tag 330; therefore, the interfering reflections are superimposed on the RFID response signal.

Using antenna A 303, RFID reader module 292 reads the RFID response signal on tag antenna 333. The RFID response signal also includes a combination of reflection signals: (i) RFID tag reflection signals (ii) known reflection signals, which are reflections from static or known objects, and (iii) interference reflection signals, which are reflection signals from unknown objects. RFID reader module 292 mixes the RFID response signal with the RFID transmit signal to determine a common frequency, then demodulates the mixed signal. The demodulated signal is provided to LTU 242, which extracts, from the demodulated RFID response signal, the interfering reflection signals. LTU 242 subtracts known reflection signals from interfering reflection signals, thus leaving for analysis the detected interference reflection signals if the RFID transmit signal interacts with an unknown object. Herein, newly detected reflection signals will be identified as "interference reflection signal(s)". LTU 242 determines the position of an object, in part, by analyzing the origin of the interference reflection signals. By determining the original position of the interference reflections, RFID reader module 292 can calculate a time of flight of the RFID transmit signal, the position of interference, and intensity of the interference of the interference reflection signals. LTU 242 correlates the interference reflection signals to points of detection for the object. As will be discussed, the points of detection are based on a predetermined grid coordinate system.

Figure 4A:
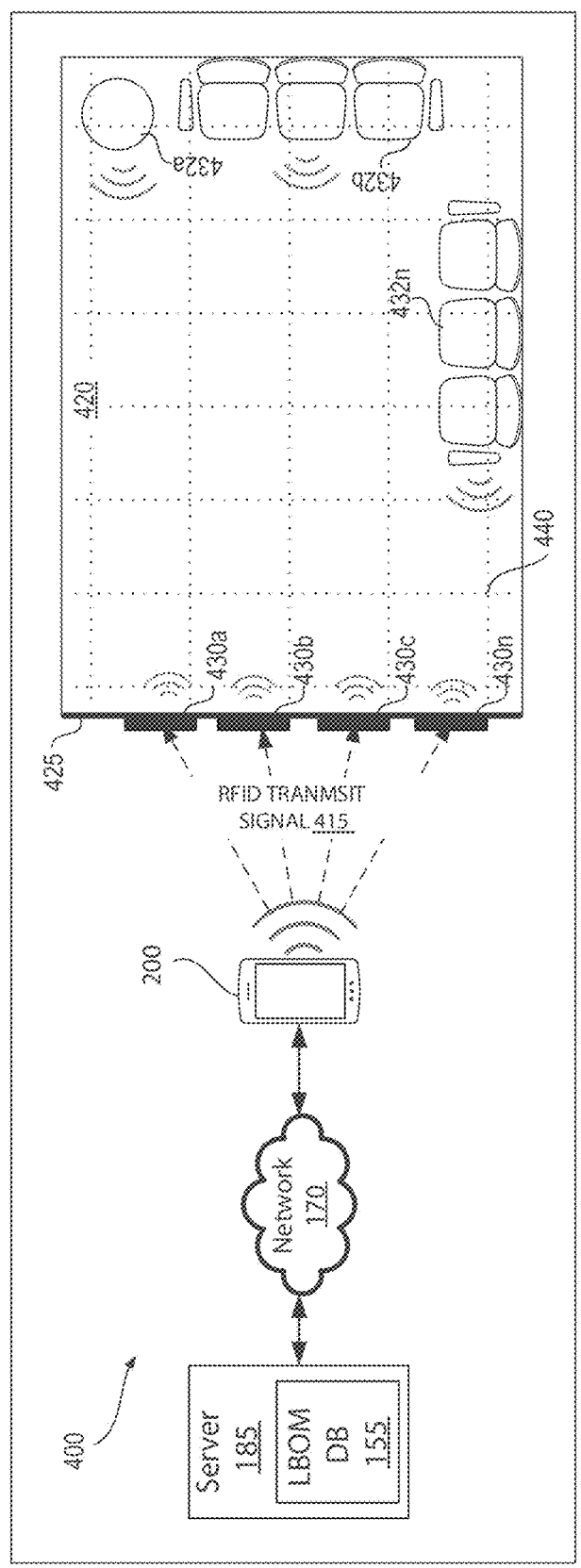
FIGS. 4A and 4B illustrates a communication network in which the mobile device of FIG. 2 can be used to transmit signals through a boundary, into a space that is a monitored location, according to one or more embodiments.
Figure 4B:
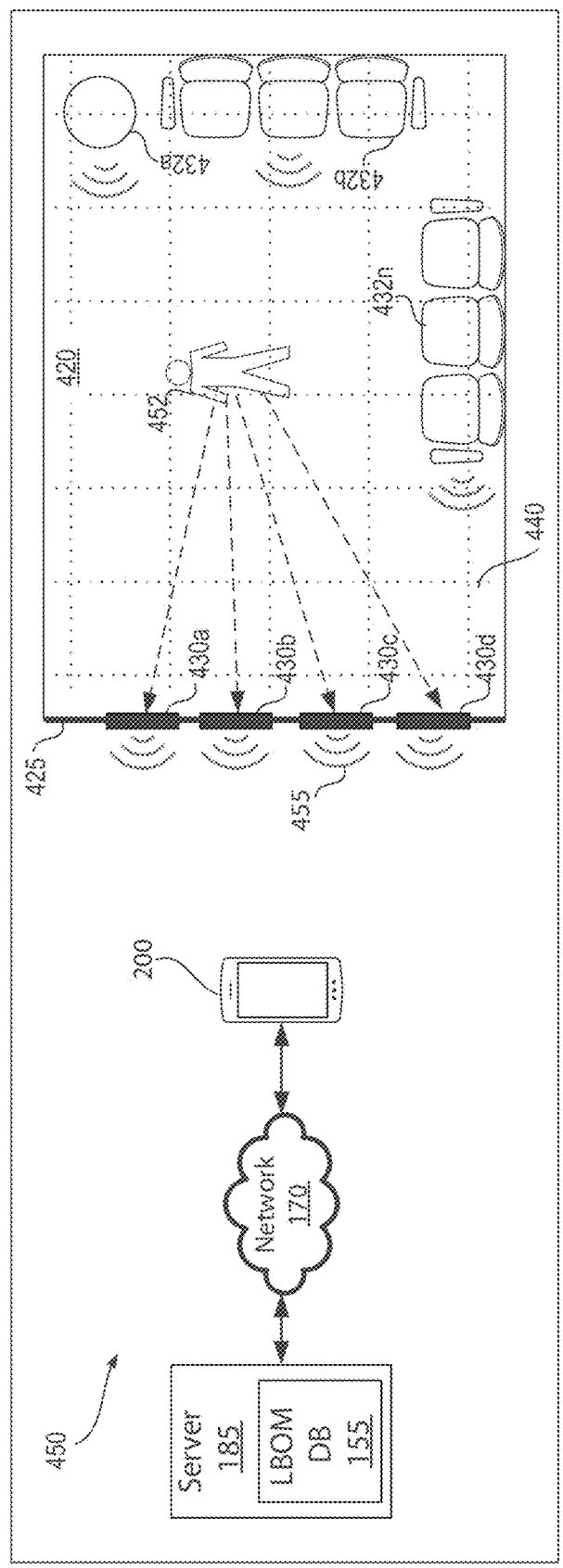

FIG. 4A and FIG. 4B respectively illustrate a communication network 400 and 450, in the mobile device of FIG. 2 that can be used to transmit RFID transmit signal 415 through boundary 425, into space 420 that is a monitored location, according to one or more embodiments.

Communication network 400 includes, generally, server 185, network 170, mobile device 200, space 420, boundary 425, and plurality of RFID tags 430a-n. Space 420 includes known objects 432a-n and grid coordinate system 440.

Similarly, communication network 450 (FIG. 4B) includes generally, server 185, network 170, mobile device 200, space 420, boundary 425, and plurality of RFID tags 430a-n. Additionally, space 420 of communication network 450 includes known objects 432a-n, unknown object 452, and grid coordinate system 440.

The plurality of RFID tags 430a-n form a RFID tag array. In one embodiment RFID reader module 292 identifies up to 1000 RFID tags per second, with a range of detection dependent, in part, on the selected frequency for the RFID communication system. Within the present embodiment, the plurality of RFID tags 430a-n are passive tags; therefore, RFID tags 430a-n do not require a battery.

Boundary 425 is a non-metallic surface composed of non-metal substances, and includes an array of RFID tags 430a-n. In one embodiment boundary 425 completely blocks space 420 from a line-of-sight of mobile device 200 and/or a user of mobile device 200. In another embodiment, boundary 425 forms a partial blockade between mobile device 200 and space 420.

Grid coordinate system 440 is a predetermined arrangement of grid coordinates that correspond to known spatial locations in space 420. The known spatial locations of grid coordinate system 440 are, at least partially, enclosed by a plurality of surfaces with at least one surface having the plurality of RFID tags 430a-n. In one embodiment, each of the known spatial locations within grid coordinate system 440 is provided as a precise three axis (x, y, z) data group.

In operation, mobile device 200 transmits a signal as RFID transmit signal 415 that has a constant amplitude, frequency, and phase. The RFID transmit signal is set to transmit within a predetermined frequency range, and the antennas of plurality of RFID tags 430a-n are tuned to receive RFID transmit signal 415 at the predetermined frequency. RFID transmit signal 415 is transmitted in the direction of the plurality of RFID tags 430a-n. A portion of RFID transmit signals 415 traverse through boundary 425, another portion of the RFID transmit signals 415 produce reflection signals when a respective RFID transmit signal intersects with at least one of plurality of RFID tags 430a-n. A RFID response signal 455 is generated at the respective RFID tag. The response signal is a backscatter signal that is a combination of the RFID tag reflection signal and interference reflection signals corresponding to one or more objects in the monitored space. The respective RFID tag ID of the plurality of RFID tags 430a-n is modulated on the backscatter signal. In the example of FIG. 4A, since there is no new object or unknown object present in the monitored space, the modulated signal receives interference in the form of interference reflection signals from reflections from known objects 432a-n to generate, in part, RFID response signal 455. Furthermore, interference from new or unknown objects is not detected. RFID response signal 455 is read by RFID reader module 292 within mobile device 200. Interference reflection signals from objects are identifiable based on detected signal attributes which include impedance characteristics, measured at an antenna of a respective RFID tag of the plurality of RFID tags 430a-n, based on an object proximity to one or more RFID tags and/or an object location within the monitored space. In one embodiment, an object's location is based on grid coordinate system 440, and coordinates that are associated with known objects 432a-n are stored at LBOM database 252. As a result, an interference reflection signal from a known object will correspond to known impedance characteristics on an antenna of one or more of plurality of RFID tags 430a-n. The known impedance characteristics detected at the one or more antennas corresponds to a known location that is based on grid coordinate system 440.

In the example of FIG. 4B, there exists a new object and/or unknown object 452, and the RFID transmit signal interacts with unknown object 452 within space 420. Therefore, the modulated signal receives interference from known reflection signals, which are interference reflections generated when the RFID transmit signal impinges on known objects 432a-n. Additionally, the modulated signal receives interference from reflections when RFID transmit signal impinges on unknown object 452 to produce interference reflection signals.

Each of the plurality of RIFD tags 420a-n have a baseline impedance signal that includes the influence of known objects 432a-n on RFID response signal 455. When the RFID transmit signal impinges on unknown object 452, the baseline impedance of at least one of the plurality of RFID tags 430a-n changes based on the proximity of the interference reflections in space 420, generating RFID response signal 455. RFID reader module 292 monitors the plurality of RFID tags 430a-n for a variation in the baseline impedance on an antenna associated with the plurality of RFID tags 430a-n.

In one embodiment LTU 242 determines the presence and tracks the movements of unknown object 452. In response to an RFID tag from among the plurality of RFID tags 430a-n having an impedance variation, RFID reader module 292 reads RFID response signal 455 on the respective one of the plurality of RFID tags 420a-n. Processor IC 205, via execution of LTU 242, can subtract the RFID tag reflection signal and the known reflection signal from RFID response signal 455, leaving the interference reflection signal. A resulting interference signal positively identifies the presence of unknown object 452 in space 420. Further, LTU 242 tracks movement of unknown object 452 in space 420 when RFID reader module 292 identifies the active antenna and monitors and collects response signals (RFID response signals 455) from RFID tags in vicinity to the active RFID tag. As the impedance on the antenna of each RFID tag changes, LTU 242 can identify the next position and track movement of unknown object 452.

In one embodiment, unknown object 452 is a moving object. Mobile device 200 tracks unknown object 452 within space 420. LTU 242 uses the Hidden Markov Model to detect and track unknown object 452. LTU 242 employs Hidden Markov Model to correlate the reflection signal with a known spatial position within grid coordinate system 440. The Hidden Markov Model is a statistical Markov model in which the system being modeled is assumed to be a Markov process with hidden states. To define the Hidden Markov Model, the following probabilities are specified: (i) a vector of initial probabilities, (ii) observation probabilities, and (iii) transition probabilities. The state is not directly visible, but the output, dependent on the state, is visible. For example, LTU 242 treats the known positions within grid coordinate system 440 as the hidden state, or vector of initial probabilities. Unknown object 452 moves from one hidden state to another generating a sequence of states. The probability of each subsequent state is dependent on the previous state; therefore, each state has a probability distribution that is associated with the known spatial location. Each state randomly generates an observation, or observation probabilities. The detected RFID response signal 455 is treated as an observation. Each change in location of unknown object 452 is treated as the state transition, thereby providing the transition probabilities. LTU 242 tracks unknown object 452 by determining the probable sequence of positions that unknown object 452 has traversed with respect to detecting a sequence of RFID response signals (455).

In another embodiment, LTU 242 determines a time of flight of the RFID transmit signal 415. Determining the time of flight of RFID transmit signal 415 enables LTU 242 to determine the point within grid coordinate system 440 in which RFID transmit signal 415 reflects back to the respective RFID tag to generate the interference signal. The time of flight, which is the time from transmission of RFID transmit signal 415 until a reflection of RFID transmit signal 415 is received (as the interference signal) at the respective RFID tag, helps to determine the distance of unknown object 452. The time of flight of RFID transmit signal 415 is based on known positions within grid coordinate system 440. RFID reader module 292 is calibrated by transmitting RFID transmit signal 415 in the direction of space 420 having known objects 432a-n. A baseline time of flight of RFID transmit signal 415, a baseline received signal strength (RSS) and a phase value of RFID response signal 455 is recorded.

RFID reader module 292 monitors plurality of RFID tags 430a-n to detect an impedance variation on the antenna of a respective RFID tag. In response to detecting an impedance variation, processor IC 205 enables RFID reader module 292 to read RFID response signal 455. Processor IC 205 compares the baseline measurements of time of flight of RFID transmit signal 415, baseline received signal strength (RSS) and a phase value of response signal 455 to the corresponding measurements received with respect to the detected RFID response signal 455. Detecting the time of flight of the reflection of RFID transmit signal 415 enables processor IC 205 to calculate how long RFID transmit signal 415 traverses through space 420 until RFID transmit signal 415 impinges on unknown object 452. The time of flight corresponds to the distance the signal travels until a point of reflection, the point of reflection correlates to a known spatial location within grid coordinate system 440.

Further, LTU 242 detects and stores the horizontal (x) and vertical (y) position (see x, y, z coordinate reference in FIG. 5) at which RFID response signal 455 is received. Detecting the x and y coordinates where RFID response signal 455 is received enables LTU 242 to utilize the x and y position of the received interference signal to determine approximate x and y coordinates of unknown object 452. Further, LTU 242 is able to calculate the distance (z) into space 420 of unknown object 452 from the time of flight of RFID transmit signal 415. The interference signal received at the respective RFID tag further includes a respective RSS and phase value that is determinable from the intensity of the extracted interference signal. Therefore, utilizing detected measurements of the time of flight of RFID transmit signal 415, the horizontal position and vertical position of RFID response signal 455, as well as the intensity of the extracted reflection signal, LTU 242 can calculate more specific position data (x, y, z coordinate position) of unknown object 452. Additionally, by comparing the baseline measurements to the detected measurements, LTU 242 can determine the absorption rate of RFID transmit signal 415. Calculating the absorption rate of RFID transmit signal 415 enables LTU 242 to, at least in part, determine a material composition of unknown object 452.

LTU 242 archives the more specific position data of unknown object 452 in LBOM database 155 and/or local database 252. In one or more embodiments, subsequent determined characteristics of unknown object 452 are archived in LBOM database 155 and/or local database 252. The real-time observations of RFID reader module 292 and calculated measurements of LTU 242 are output to display 226 of mobile device 200 for real time location mapping of unknown object 452 in space 420.

Now turning to FIG. 5, which illustrates an example Bluetooth enabled communication network 500 in which the mobile device of FIG. 2 can be used to detect and track unknown object 526 behind boundary 502 in space 520, within which certain aspects of the disclosure can be practiced, according to one or more embodiments. Bluetooth enabled communication network 500 generally includes mobile device 200, boundary 502, BLE beacon 505, space 520, unknown object 526, RFID tag array 535, and grid coordinate system 540.

BLE beacon 505 is a Bluetooth enabled transmitter. BLE beacon 505 is attached to and/or associated with unknown object 526. BLE beacon 505 broadcasts via BLE beacon response signal 525 a universally unique identifier that can be detected by a nearby Bluetooth enabled device, for example mobile device 200. BLE beacon 505 and mobile device 200 can communicate between the frequency range of 2.402-2.480 GHz, or 2.400-2.483 GHz.

RFID tag array 535 includes a plurality of passive RFID tags. Similar to the plurality of RFID tags 430a-n of FIG. 4, RFID tags of RFID tag array 535 do not require a battery. In one embodiment, RFID reader module 292 operates in the ultra-high frequency range of 869-960 megahertz (MHz) to interrogate, or read, each of the plurality of RFID tags of RFID tag array 535. In another embodiment, RFID reader module 292 utilizes a beam-steerable phased-array antenna that interrogates passive tags at a distance of 600 feet or more.

In operation, mobile device 200 is obstructed by one or more physical obstructions within a space, for example, the physical obstruction can be boundary 502. Processor IC 205 enables transmission, from BLE module 224, of a Bluetooth inquiry signal. BLE module 224 transmits the Bluetooth inquiry signal at a first frequency range, and the Bluetooth inquiry signal traverses into space, such as space 520, which exists behind a physical barrier, boundary 502. Boundary 502 is pre-configured with a plurality of RFID tags which form RFID tag array 535. BLE module 224 monitors for a corresponding BLE beacon response signal 525, also emitted at the first frequency range. In response to one of (i) not detecting the corresponding BLE beacon response signal 525 associated with BLE beacon 505, from space 520, or (ii) detecting only a generalized BLE beacon response signal indicating a general presence of unknown object 526 within space 520, LTU 242 transmits of mobile device 200, via RFID reader module 292, a second signal at a second frequency range. In response to transmission of the second signal, RFID reader module 292 monitors for and records a RFID response signal from at least one of the plurality of RFID tags within RFID tag array 535.

RFID reader module 292 monitors at least one RFID tag of RFID tag array 535 to determine the presence of a backscatter signal, or the RFID response signal. As described in FIG. 3, the RFID response signal which is read at an RFID tag includes a combination of reflection signals: (i) RFID tag reflection signals (ii) known reflection signals, and (III) interference reflection signals. RFID reader module 292 monitors for and records the RFID response signal (455). LTU 242 associates each received RFID response signal with a corresponding location within space 520 based on grid coordinate system 540.

In this example, processor IC 205, via execution of LTU 242, can subtract the RFID tag reflection signal and the known reflection signal from the RFID response signal. In response to having a remaining signal, interference reflection signal, LTU 242 outputs a confirmation that unknown object 526 is present in space 520. The interference signal is further analyzed to determine a size and shape of unknown object 526. The size and shape of unknown object 526 is obtained by reading RFID tags in vicinity to a first detected RFID tag. LTU 242 determines the approximate length of unknown object 526 by observing a lower and upper antenna from which the RFID response signal is read. LTU 242 can determine an approximate width from reading a far most left and right antenna that has the RFID response signal. RFID reader module can monitor and continue to read RFID tags in vicinity to the detected RFID tags to increase the number of reference points for determining the length and width of unknown object 526.

LTU 242 analyzes the time of flight of the RFID transmit signal to determine the distance (Z) in which the RFID transmit traverses through space 520 before the RFID transmit signal is reflected. LTU 242 determines coordinates points that correspond to the calculated width (X), length (Y), and distance (Z) into monitored location of unknown object 526, according to grid coordinate system 540. LTU 242 provides an output to the graphical user interface of mobile device 200. The output corresponds to real-time response signals, when observed within space 520. In response to observation of unknown object 526 in space 520, the output can be displayed on display 226 electronic device 200. The output can include a graphical output that displays the position of each recorded X, Y, and Z coordinate point detected that corresponds to unknown object 526 in relation to grid coordinate system 540.

In one embodiment, RFID reader module continuously monitors each RFID tag of RFID tag array 535 for an impedance change to track movement of unknown object 526. RFID reader module 292 is capable of reading, for example, 1000 RFID tags per second. As the impedance changes on each RFID tag antenna, RFID reader module 192 records the signal and continues monitoring. LTU 242 provides an output to the graphical user interface of mobile device 200 that corresponds to the real-time changes in the RFID response signals detected at RFID tag array 535.

In another embodiment, processor IC 205 enables transmission, from the first module, of a wireless inquiry signal, at a first frequency. For example, the first module can be a firmware module (218) that operates in association with transceiver 230 to transmit the wireless inquiry signal via antenna 232. Further, in another embodiment, the firmware module could operate in association with NFC TRANS 225. In still another embodiment, the first module can be GPS module 258. The first module transmits the first inquiry signal at the first frequency range, and monitors for a corresponding response signal that respectively corresponds to a signal transmitted at the frequency range of the first inquiry signal. In response to one of (i) not detecting the corresponding response signal associated with first inquiry signal, from space 520, or (ii) detecting only a generalized response signal indicating a general presence of unknown object 526 within space 520, LTU 242 transmits, via RFID reader module 292, a second signal at a second frequency range.

Figure 6:
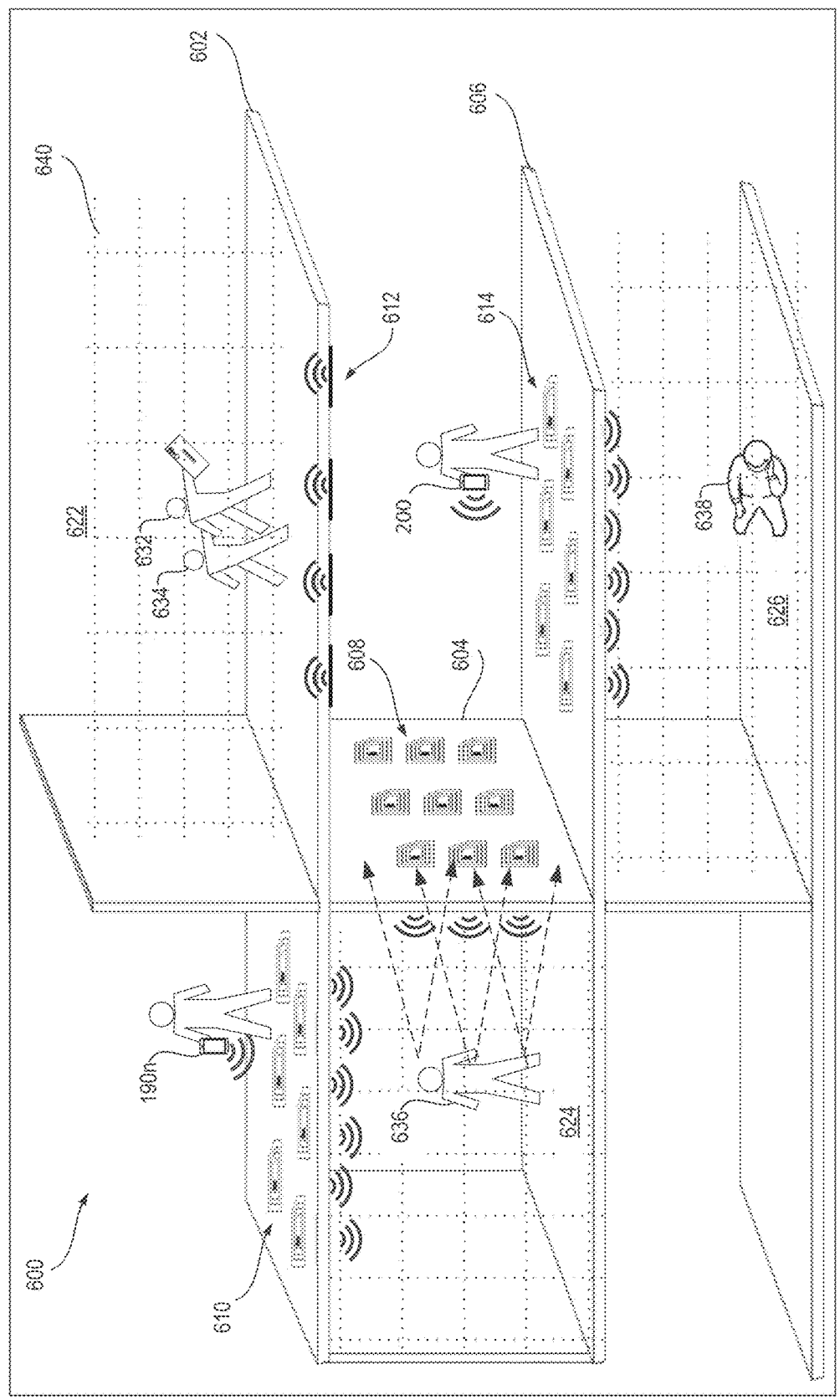
FIG. 6 illustrates an example communication network in which the mobile device of FIG. 2 can be used to detect and track an unknown object behind a boundary in a space within which certain aspects of the disclosure can be practiced, in accordance with one or more embodiments.

FIG. 6 illustrates example communication network 600 in which a mobile device of FIG. 2 can be used to detect and track an unknown object (632, 634, 636, 638) behind a boundary (602, 604, 606) in a space (622, 624, and 626) within which certain aspects of the disclosure can be practiced. In one example, example communication network 600 detects and tracks unknown objects 634 and 632 behind boundary 602 in space 622, where boundary 602 is a ceiling. The plurality of RFID tags 612 are affixed to boundary 602. Space 622 is virtually partitioned into grid coordinate system 640. A module of mobile device 200 transmits a first signal at a first frequency (e.g. Bluetooth signal) and a second signal at a second frequency (RFID transmit signal) in the direction of the plurality of RFID tags 612. The RFID transmit signal propagates through boundary 602. The RFID transmit signal has a constant amplitude, frequency, and phase and produces a backscatter signal by at least one of the plurality of RFID tags 612 to generate a RFID response signal. The RFID response signal includes a combination of reflection signals: (i) RFID tag reflection signals (ii) known reflection signals, and (III) interference reflection signals. It should be noted that interference reflection signals would only be observed when there are unknown objects within the monitored location.

Unknown objects 632 and 634 are in motion. RFID reader module 292 identifies a group of the plurality of RFID tags 612 have detected interference reflections by detecting a variation in impedance on each of the corresponding antennas. The variation in impedance is detected/identified if the variation exceeds a predetermined threshold, or baseline. LTU 242 identifies, from evaluation of the subsequent response signal, movement of unknown objects 632 and 634 within the known spatial location.

RFID reader module 292 identifies an active tag of at least one of the plurality of RFID tags 612 based on modulation of a respective tag identification on the backscatter signals. RFID reader module 292 interrogates one or more adjacent tags to identify the next RFID tag from among plurality of RFID tags 612 that has at least a threshold amount of variation in impedance on the associated antenna. In response to identifying an adjacent RFID tag that has at least the threshold amount of variation in impedance, RFID reader module 292 provides the corresponding RFID response signal to LTU 242. LTU 242 extracts the interference reflection signal from each received response signal. LTU 242 can identify that there are more than one target objects present in space 622 based on the spacing of interference reflections extracted from the RFID response signal, and the respective time of flight within grid coordinate system 640 of the RFID transmit signal. RFID reader module continues to interrogate RFID tags that are adjacent to an RFID tag in which the RFID response signal is detected to determine a velocity and trajectory of unknown object 632 and 634 based, at least in part, on the time of flight of the RFID transmit signal, the RSS and the phase value of the extracted interference reflection signal. In one embodiment, in response to detection of unknown object 632, mobile device 190n assigns a "known object status" to unknown object 632, and the known reflection signal (or baseline response signal) is updated. Therefore, a subsequent object (unknown object 634) entering space 622 is detected based on the response signal having the updated known reflection signal.

In another example, example communication network 600 detects and tracks target object 638 behind boundary 606 in space 626, where boundary 606 is a floor. RFID tags 614 are affixed to boundary 606 in an array formation. Space 626 is also virtually partitioned into grid coordinate system 640. BLE module 224 of mobile device 200 transmits a first signal at a first frequency (Bluetooth signal). In this example, from the position of mobile device 200 with respect to the BLE beacon, the BLE beacon response signal is undetectable by BLE module 224 of mobile device 200. This means the BLE beacon is not present and/or not detectable in space 626, from the position of mobile device 200, and is therefore less likely to enable the identification of specific location data of the BLE beacon. More specifically, when mobile device 200 is outside a predetermined range BLE beacon is undetectable in space 626. The BLE beacon (and any associated object) is less likely to be accurately tracked using only the first inquiry signal transmitted from mobile device 200. RFID reader module 292 of mobile device 200 transmits a second signal at a second frequency (RFID transmit signal) in the direction of plurality of RFID tags 612.

RFID reader module 292 identifies an activated one of the plurality of RFID tags 614 by detecting a variation in an impedance on an antenna associated with at least one of plurality of RFID tags 614. RFID reader module 292 can identify each activated tag based on modulation of a respective tag identification on the backscatter signals. RFID reader module 292 interrogates one or more adjacent tags to identify the next RFID tag from among plurality of RFID tags 614 that has a variation in impedance on the associated antenna. LTU 242 extracts the reflection signal from each received response signal. In response to not identifying more tags with a variation in impedance in vicinity to the read RFID tags, LTU 242 determines unknown object 638 is not in motion. In one embodiment, LTU 242 monitors the time span unknown object 638 is not in motion and generates an alert and/or corresponding operation.

In still another example, within example communication network 600 mobile device 200 detects and tracks unknown object 636 behind boundary 604 in space 626, where boundary 604 is a wall. RFID tags 608 are affixed to boundary 604 in an array formation. Plurality of RFID tags 610, are affixed to boundary 602 within space 624. Space 624 is also virtually partitioned into grid coordinate system 640. LTU 242 identifies that RFID reader module 292 is in motion. In response to RFID reader module 292 being in motion, LTU 242 delays transmission of the second signal until a velocity of RFID reader module 292 is less than a predetermined threshold velocity. In response to the velocity of RFID reader module 292 being below the predetermined threshold velocity, mobile device 200 transmits a first signal at a first frequency (Bluetooth signal) and a second signal at a second frequency (RFID transmit signal) in the direction of plurality of RFID tags 608.

RFID reader module 292 interrogates at least one of plurality of RFID tags 608 to determine whether an object is behind boundary 604. In response detecting a response signal on the at least one RFID tag of plurality of RFID tags 608, LTU 242 extracts the reflection signal from the response signal, and LTU 242 determines, in part, the time of flight within grid coordinate system 640. Mobile device 190n transmits a subsequent RFID transmit signal to obtain more position data associated with unknown object 636. In response to mobile device 190n obtaining more position data associated with each unknown object 636, LTU 242 of mobile device 190n updates the position data in the database. LTU 242 of mobile device 200 and 190n periodically updates LBOM database 155 with the more specific position data received from one or more RFID reader modules (292 and 192n). LTU 242 aggregates position data received in real-time by mobile device 190n with position data that is updated from mobile device 200, to form a known pattern of specific movements of unknown object 636. LTU 242 correlates, within LBOM database 155, the known pattern of specific movements occurring within the monitored location with a resulting operation that can affect one or more of an unknown object 636 within the monitored location, a user device, a user of the user device, and an operational system.

Further, LTU 242 detects at least one subsequent response signal that corresponds to movement of the unknown object 636. From LBOM database 155, LTU 242 identifies position data associated with a collection of response signals that are collected by one or more RFID reader modules 292 and 192n that are in vicinity to space 624. Mobile device 190n provides additional position data of unknown object 636 to LBOM database 155 based on the interrogations of plurality of RFID tags 610 positioned on the ceiling of space 624. Receiving position data from an alternate position further enables LTU 242 to pinpoint specific spatial coordinates of one or more objects within the known spatial location and track multi-dimensional movement of the target object within the known spatial location.

Mobile device 200 enables an operator and/or observer to detect and track a target object in a monitored location. It is not necessary for the target object to have a BLE beacon or any other tracking device associated therewith. The detection and tracking capability of mobile device 200 and an associated plurality of RFID tags does not violate privacy of an individual, and could potentially be a life-saving system of devices.

Figure 7:
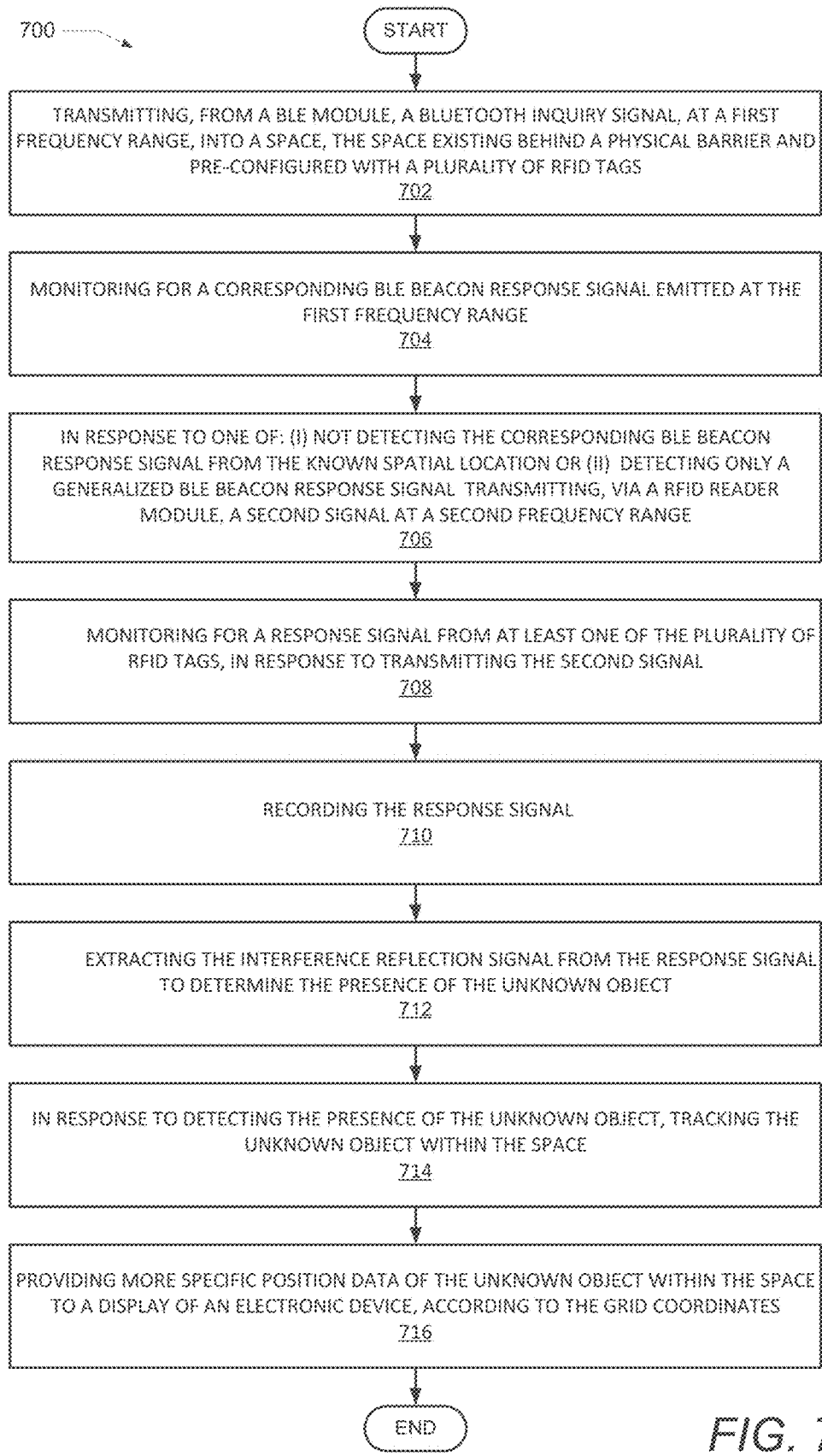
FIG. 7 is a flow chart illustrating a method for transmitting signals through a boundary, into a space that is a monitored location, to detect and track objects in the space, in accordance with one or more embodiments.

Referring now to FIG. 7, there is provided a flow chart illustrating a method for transmitting signals through a boundary, into a space that is a monitored location to detect and track objects in the monitored location, in accordance with one or more embodiments. Aspects of the methods are described with reference to the components of FIGS. 1-6. Several of the processes of the method provided in FIG. 7 can be implemented by a processor (e.g., processor IC 205) executing software code of LTU 242. In the following method processes described in FIG. 7, processor IC 205 executes LTU 242 to perform the steps described herein.

Method 700 commences at the start block, then proceeds to block 702. At block 702 processor IC 205 transmits, from a Bluetooth low energy (BLE) module, a Bluetooth inquiry signal, at a first frequency range, into a space. The space exists behind a physical barrier and is pre-configured with a plurality of RFID tags. Each RFID tag is capable of producing a backscatter signal. At block 704, BLE module 224 monitors for a corresponding BLE beacon response signal emitted at the first frequency range. In response to one of: (i) not detecting the corresponding BLE beacon response signal from the known spatial location or (ii) detecting only a generalized BLE beacon response signal indicating a general presence of a target object within the known spatial location, processor IC 205 transmits, via RFID reader module 292, a second signal at a second frequency range, at block 706. At block 708, RFID reader module 292 monitors for a response signal from at least one of the plurality of RFID tags, in response to transmitting the second signal. The response signal is a backscatter signal that is a combination of a RFID tag reflection signal, a known reflection signal from a known object, and an interference reflection signal from an unknown object in the space. At block 710, processor IC 205 records the response signal. At block 712, processor IC 205 extracts the interference reflection signal from the response signal to determine the presence of the unknown object. In response to detecting the presence of the unknown object, at block 714 RFID reader module 292 tracks the unknown object within the space. At block 716, processor IC 205 provides more specific position data of the unknown object within the space to a display of an electronic device, according to the grid coordinate system. The process concludes at the end block.

In the above-described flow charts, one or more of the method processes may be embodied in a computer readable device containing computer readable code such that a series of steps are performed when the computer readable code is executed on a computing device. In some implementations, certain steps of the methods are combined, performed simultaneously or in a different order, or perhaps omitted, without deviating from the scope of the disclosure. Thus, while the method steps are described and illustrated in a particular sequence, use of a specific sequence of steps is not meant to imply any limitations on the disclosure. Changes may be made with regards to the sequence of steps without departing from the spirit or scope of the present disclosure. Use of a particular sequence is therefore, not to be taken in a limiting sense, and the scope of the present disclosure is defined only by the appended claims.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. Computer program code for carrying out operations for aspects of the present disclosure may be written in any combination of one or more programming languages, including an object oriented programming language, without limitation. These computer program instructions may be provided to a processor of a general purpose computer, special purpose computer, or other programmable data processing apparatus to produce a machine that performs the method for implementing the functions/acts specified in the flowchart and/or block diagram block or blocks. The methods are implemented when the instructions are executed via the processor of the computer or other programmable data processing apparatus.

As will be further appreciated, the processes in embodiments of the present disclosure may be implemented using any combination of software, firmware, or hardware. Accordingly, aspects of the present disclosure may take the form of an entirely hardware embodiment or an embodiment combining software (including firmware, resident software, micro-code, etc.) and hardware aspects that may all generally be referred to herein as a "circuit," "module," or "system." Furthermore, aspects of the present disclosure may take the form of a computer program product embodied in one or more computer readable storage device(s) having computer readable program code embodied thereon. Any combination of one or more computer readable storage device(s) may be utilized. The computer readable storage device may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage device can include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage device may be any tangible medium that can contain, or store a program for use by or in connection with an instruction execution system, apparatus, or device.

Where utilized herein, the terms "tangible" and "non-transitory" are intended to describe a computer-readable storage medium (or "memory") excluding propagating electromagnetic signals; but are not intended to otherwise limit the type of physical computer-readable storage device that is encompassed by the phrase "computer-readable medium" or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

While the disclosure has been described with reference to example embodiments, it will be understood by those skilled in the art that various changes may be made and equivalents may be substituted for elements thereof without departing from the scope of the disclosure. In addition, many modifications may be made to adapt a particular system, device, or component thereof to the teachings of the disclosure without departing from the scope thereof. Therefore, it is intended that the disclosure not be limited to the particular embodiments disclosed for carrying out this disclosure, but that the disclosure will include all embodiments falling within the scope of the appended claims.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

What is claimed is:

1. A method comprising:
transmitting, from a first module, a first inquiry signal, at a first frequency range, that traverses into a space associated with a predetermined grid coordinate system, the space existing behind a physical barrier and is pre-configured with a plurality of radio frequency identification (RFID) tags, each RFID tag is capable of producing a backscatter signal;
monitoring for a corresponding response signal to the first inquiry signal that is emitted at the first frequency range;
in response to one of: (i) not detecting the corresponding response signal from the space or (ii) detecting only a generalized response signal indicating a general presence of a detected object within the space, transmitting, via a RFID reader module, a second signal at a second frequency range;
in response to transmitting the second signal, monitoring for a response signal from at least one of the plurality of RFID tags;
recording the response signal, wherein the response signal is a backscatter signal that is a combination of a RFID tag reflection signal, a known reflection signal from a known object, and an interference reflection signal from an unknown object in the space;
extracting the interference reflection signal from the response signal to determine the presence of the unknown object; and
in response to detecting the presence of the unknown object, tracking the unknown object within the space, and providing more specific position data of the unknown object within the space, to a display of an electronic device, according to the predetermined grid coordinate system.

2. The method of claim 1, further comprising:
transmitting the second signal as an RFID transmit signal, wherein the RFID transmit signal has a constant amplitude, frequency, and phase that produces the backscatter signal by inducing a voltage on an antenna of the at least one of the plurality of RFID tags; and
identifying the at least one of the plurality of RFID tags based on modulation of a respective tag identification on the backscatter signal, wherein a variation in an impedance on the antenna of the at least one of the plurality of RFID tags corresponds to the respective tag identification.

3. The method of claim 1, wherein transmitting, from a first module, a first inquiry signal further comprises transmitting, from a Bluetooth Low Energy (BLE) module, a Bluetooth inquiry signal.

4. The method of claim 1, wherein the space is at least partially enclosed by a plurality of surfaces, with at least one surface having the plurality of RFID tags.

5. The method of claim 1, further comprising:
identifying, from at least one extracted interference reflection signal, a time of flight of the second signal, a received signal strength (RSS) and a phase value of the at least one extracted interference reflection signal, wherein the time of flight, the RSS, and the phase value of the at least one extracted interference reflection signal identifies, at least in part, the more specific position data of the detected object when the detected object is observed within the space;
determining a trajectory of the unknown object based, at least in part, on the time of flight of the second signal, the RSS and the phase value of the second signal; and
determining a velocity of the unknown object based, at least in part, on a tag identification associated with each extracted interference reflection signal.

6. The method of claim 1, providing more specific position data of the detected object within the space to a database, wherein the database is a location-based operation mapping database, and the method further comprises:
archiving the more specific position data in the database; and
periodically updating the database with the more specific position data received from one or more RFID reader modules in response to receiving, at one or more RFID reader modules, the response signal that is read from at least one of the plurality of RFID tags.

7. The method of claim 6, further comprising:
aggregating position data received in real-time with position data that is archived, to form a known pattern of specific movements; and
correlating, within the location-based operation mapping database, the known pattern of specific movements occurring within the space with a resulting operation that can affect one or more objects within the space, a user device, a user of the user device, and an operational system.

8. The method of claim 6, further comprising:
detecting at least one subsequent response signal corresponding to movement of the detected object; and
identifying, from the location-based operation mapping database, position data associated with a collection of response signals that are collected by one or more RFID reader modules in vicinity to space to pinpoint spatial coordinates of one or more objects within the space and track movement of the detected object within the space.

9. The method of claim 1, further comprising:
monitoring, via the RFID reader module, an identified RFID tag and one or more RFID tags in vicinity to the identified RFID tag to detect a subsequent response signal;
identifying, from evaluation of the subsequent response signal, movement of the detected object within the space; and
determining when the subsequent response signal correlates to a presence of a subsequent object within the space.

10. The method of claim 1, further comprising:
identifying that the RFID reader module is in motion; and
in response to the RFID reader module being in motion, delaying transmission of the second signal until a velocity of the RFID reader module is less than a predetermined threshold.

11. A data processing device comprising:
a first module that transmits a first inquiry signal, at a first frequency range, that traverses into a space associated with a predetermined grid coordinate system, the space existing behind a physical barrier and is pre-configured with a plurality of radio frequency identification (RFID) tags, each RFID tag is capable of producing a backscatter signal;
a monitoring component that monitors for a corresponding response signal to the first inquiry signal that is emitted at the first frequency range; and
a processor that is communicatively coupled to the first module and the monitoring component and which:

in response to one of: (i) not detecting the corresponding response signal from the space or (ii) detecting only a generalized response signal indicating a general presence of a detected object within the space, transmits, via a RFID reader module, a second signal at a second frequency range;

in response to transmitting the second signal, monitors for a response signal from at least one of the plurality of RFID tags, the response signal being generated in response to the second signal impinging on the RFID tag and one or more objects in the space, wherein the response signal is a backscatter signal that is a combination of a RFID tag reflection signal, a known reflection signal from a known object, and an interference reflection signal from an unknown object in the space;

extracts the interference reflection signal from the response signal to determine a presence of the unknown object; and in response to detecting the presence of the unknown object, tracks the unknown object within the space, and provides, to a display, more specific position data of the unknown object within the space, according to the predetermined grid coordinate system.

12. The data processing device of claim 11, wherein the RFID reader module:

transmits the second signal as an RFID transmit signal, wherein the RFID transmit signal has a constant amplitude, frequency, and phase that produces the backscatter signal by inducing a voltage on an antenna of the at least one of the plurality of RFID tags; and identifies the at least one of the plurality of RFID tags based on modulation of a respective tag identification on the backscatter signal, wherein a variation in an impedance on the antenna of the at least one of the plurality of RFID tags corresponds to the respective tag identification.

13. The data processing device of claim 11, wherein the processor:

identifies, from at least one extracted interference reflection signal, a time of flight of the second signal, a received signal strength (RSS), and a phase value of the at least one extracted interference reflection signal, wherein the time of flight of the second signal, the RSS, and the phase value of the at least one extracted interference reflection signal identifies, at least in part, the more specific position data of the unknown object when the unknown object is observed within the space, wherein the space is at least partially, enclosed by a plurality of surfaces with at least one surface having the plurality of RFID tags;

determines a trajectory of the unknown object based, at least in part, on the time of flight of the second signal, the RSS and the phase value of the second signal; and determines a velocity of the unknown object based, at least in part, on a tag identification associated with each extracted interference reflection signal.

14. The data processing device of claim 11, wherein the processor:

archives the more specific position data in a database, wherein the database is a location-based operation mapping database;

periodically updates the database with the more specific position data received from one or more RFID reader modules in response to receiving, at one or more RFID reader modules, the response signal that is collected from at least one of the plurality of RFID tags;

aggregates position data received in real-time with position data that is archived, to form a known pattern of specific movements;

correlates, within the location-based operation mapping database, the known pattern of specific movements occurring within the space with a resulting operation that can affect one or more objects within the space, a user device, a user of the user device, and an operational system;

detects at least one subsequent response signal corresponding to movement of the unknown object; and identifies, from the location-based operation mapping database, position data associated with a collection of response signals that are read by one or more RFID reader modules in vicinity to space to pinpoint spatial coordinates of one or more objects within the space and track movement of the detected object within the space.

15. The data processing device of claim 11, wherein the processor further:

triggers the RFID reader module to monitor an identified RFID tag and one or more RFID tags in vicinity to the identified RFID tag to detect a subsequent response signal;

identifies, from evaluation of the subsequent response signal, movement of the unknown object within the space; and determines when the subsequent response signal correlates to a presence of a subsequent object within the space.

16. The data processing device of claim 11, wherein the processor:

identifies that the RFID reader module is in motion; and in response to the RFID reader module being in motion, delays transmission of the second signal until a velocity of the RFID reader module is less than a predetermined threshold velocity.

17. A computer program product comprising:

a computer readable storage device; and program code on the computer readable storage device that when executed within a processor associated with a device, the program code enables the device to provide a functionality of:

transmitting, from a first module, a first inquiry signal, at a first frequency range, that traverses into a space associated with a predetermined grid coordinate system, the space existing behind a physical barrier and is pre-configured with a plurality of radio frequency identification (RFID) tags, each RFID tag is capable of producing a backscatter signal;

monitoring for a corresponding response signal that is emitted at the first frequency range;

in response to one of: (i) not detecting the corresponding response signal from the space or (ii) detecting only a generalized response signal indicating a general presence of a detected object within the space, transmitting, via a RFID reader module, a second signal at a second frequency range;

in response to transmitting the second signal, monitoring for a response signal from at least one of the plurality of RFID tags, the response signal being generated in response to the second signal impinging on the RFID tag and one or more objects in the space, wherein the response signal is a backscatter signal that is a combination of a RFID tag reflection signal, a known reflection signal from a known object, and an interference reflection signal from an unknown object in the space;

extracting the interference reflection signal from the response signal to determine the presence of the unknown object; and in response to detecting the presence of the unknown object, tracking the unknown object within the space, and providing more specific position data of the unknown object within the space, according to the predetermined grid coordinate system, to a display device.

18. The computer program product of claim 17, wherein the program codes further comprises program code that enables the device to provide a functionality of:

identifying that the RFID reader module is in motion;

in response to the RFID reader module being in motion, delaying transmission of the second signal until a velocity of the RFID reader module is less than a predetermined threshold;

transmitting the second signal as an RFID transmit signal, wherein the RFID transmit signal has a constant amplitude, frequency, and phase that produces the backscatter signal by inducing a voltage on an antenna of the at least one of the plurality of RFID tags;

identifying the at least one of the plurality of RFID tags based on modulation of a respective tag identification on the backscatter signal, wherein a variation in an impedance on the antenna of the at least one of the plurality of RFID tags corresponds to the respective tag identification;

identifying, from at least one extracted interference reflection signal, a time of flight of the second signal, a received signal strength (RSS) and a phase value of the at least one extracted interference reflection signal, wherein the time of flight of the second signal, the RSS, and the phase value of the at least one extracted interference reflection signal identifies, at least in part, the more specific position data of the detected object when the detected object is observed within the space, wherein the space is, at least partially, enclosed by a plurality of surfaces with at least one surface having the plurality of RFID tags; and determining a trajectory of the detected object based, at least in part, on the time of flight of the second signal, the RSS and the phase value of the second signal; and determining a velocity of the detected object based, at least in part, on a tag identification associated with each extracted interference reflection signal.

19. The computer program product of claim 17, wherein the program codes further comprises program code that enables the device to provide a functionality of:

archiving the more specific position data in a database, wherein the database is a location-based operation mapping database;

periodically updating the database with the more specific position data received from one or more RFID reader modules in response to receiving, at one or more RFID reader modules, the response signal that is collected from at least one of the plurality of RFID tags;

aggregating position data received in real-time with position data that is archived, to form a known pattern of specific movements;

correlating, within the location-based operation mapping database, the known pattern of specific movements occurring within the space with a resulting operation that can affect one or more objects within the space, a user device, a user of the user device, and an operational system;

detecting at least one subsequent response signal corresponding to movement of the detected object; and identifying, from the location-based operation mapping database, position data associated with a collection of response signals that are read by one or more RFID reader modules in vicinity to space to pinpoint spatial coordinates of one or more objects within the space and track movement of the detected object within the space.

20. The computer program product of claim 17, wherein the program codes further comprises program code that enables the device to provide a functionality of:

monitoring, via the RFID reader module, an identified RFID tag and one or more RFID tags in vicinity to the identified RFID tag to detect a subsequent response signal;

identifying, from evaluation of the subsequent response signal, movement of the detected object within the space; and determining when the subsequent response signal correlates to a presence of a subsequent object within the space.

* * * * *